(12) United States Patent
Suzuki

(10) Patent No.: US 10,943,587 B2
(45) Date of Patent: Mar. 9, 2021

(54) INFORMATION PROCESSING DEVICE AND INFORMATION PROCESSING METHOD

(71) Applicant: Toyota Jidosha Kabushiki Kaisha, Toyota (JP)

(72) Inventor: Koichi Suzuki, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 105 days.

(21) Appl. No.: 16/234,858

(22) Filed: Dec. 28, 2018

(65) Prior Publication Data

US 2019/0228769 A1 Jul. 25, 2019

(30) Foreign Application Priority Data

Jan. 22, 2018 (JP) .............................. JP2018-007867

(51) Int. Cl.
*G10L 15/22* (2006.01)
*G10L 15/18* (2013.01)
*G06F 40/30* (2020.01)
*G06F 40/242* (2020.01)

(52) U.S. Cl.
CPC ............ *G10L 15/22* (2013.01); *G06F 40/242* (2020.01); *G06F 40/30* (2020.01); *G10L 15/1815* (2013.01); *G10L 2015/223* (2013.01)

(58) Field of Classification Search
CPC ......... G10L 15/22; G10L 15/00; G10L 15/08; G10L 15/1815; G10L 15/1822; G10L 15/183; G10L 15/24; G10L 15/26; G10L 2015/22; G10L 2015/00; G10L 2015/06; G10L 2015/223; G10L 2015/225; G10L 2015/226; G10L 2015/228
USPC .... 704/235, 231, 245, 250, 257, 270, 270.1, 704/275
See application file for complete search history.

(56) References Cited

U.S. PATENT DOCUMENTS

| 8,140,335 | B2* | 3/2012 | Kennewick | ........ G06Q 30/0261 704/257 |
| 2013/0339027 | A1* | 12/2013 | Dokor | ................ B60R 16/0373 704/275 |

FOREIGN PATENT DOCUMENTS

JP 2007286136 A 11/2007

* cited by examiner

*Primary Examiner* — Qi Han
(74) *Attorney, Agent, or Firm* — Dinsmore & Shohl LLP

(57) ABSTRACT

An information processing device including an electronic control unit is provided. The electronic control unit is configured: to acquire speech data which is uttered by a user; to acquire context in associated with a situation of the user; to convert the speech data into text data; to select a dictionary which is referred to for determining a meaning of a word included in the text data based on the context information when the speech data has been acquired; to give the meaning of the word determined with reference to the selected dictionary to the text data; and to provide a service based on the text data to which the meaning of the word is given.

11 Claims, 4 Drawing Sheets

INFORMATION PROCESSING DEVICE AND INFORMATION PROCESSING METHOD

CROSS-REFERENCE TO RELATED APPLICATION

This application claims priority to Japanese Patent Application No. 2018-007867 filed on Jan. 22, 2018, incorporated herein by reference in its entirety.

BACKGROUND

1. Technical Field

The present disclosure relates to an information processing device and an information processing method.

2. Description of Related Art

Recently, devices that perform processing based on speech uttered by a user have spread. For example, Japanese Unexamined Patent Application Publication No. 2007-286136 (JP 2007-286136 A) discloses that a recognition rate of speech commands is enhanced by identifying a direction in which an uttering user is located in the inside of a vehicle and selecting a dedicated speech recognition dictionary corresponding to a source (a control target device) of information which is being watched by the identified uttering user from a plurality of dedicated recognition dictionaries.

SUMMARY

However, the technique described in JP 2007-286136 A is devised for the purpose of improvement in speech recognition rate and does not consider an operation based on appropriate understanding of a user's intention. For example, when a user utters a word "sakura," the technique described in JP 20074286136 A considers that the word "sakura" is appropriately recognized, but does not consider whether the user's intention such as whether the user is to be guided to a place famous for sakura or whether a piece of music titled "sakura" is to be played has been appropriately understood.

The present disclosure provides an information processing device and an information processing method that performs a process suitable for a user's speech intention.

An information processing device according to a first aspect of the present disclosure includes an electronic control unit. The electronic control unit is configured: to acquire speech data which is uttered by a user; to acquire context information associated with a situation of the user; to convert the speech data into text data: to select a dictionary which is referred to for determining a meaning of a word included in the text data based on the context information when the speech data has been acquired; to give the meaning of the word determined with reference to the selected dictionary to the text data; and to provide a service based on the text data to which the meaning of the word is given. In the information processing device according to the aspect, the electronic control unit may be configured to determine the meaning of the word based on the context information when the word is considered to have a plurality of meanings. In the information processing device according to the aspect, the context information may include at least one of identification information for identifying a display screen which is displayed by a device which is operated by the user and position information indicating a position of the user. In the information processing device according to the aspect, the electronic control unit may be configured to select the service which is to be provided based on the context information.

An information processing method according to a second aspect of the present disclosure is for processing speech data which is uttered by a user using an electronic control unit. The information processing method includes: causing the electronic control unit to acquire speech data uttered by the user; causing the electronic control unit to acquire context information associated with a situation of the user; causing the electronic control unit to convert the speech data into text data; causing the electronic control unit to select a dictionary which is referred to for determining a meaning of a word included in the text data based on the context information when the speech data has been acquired; causing the electronic control unit to give the meaning of the word determined with reference to the selected dictionary to the text data; and causing the electronic control unit to provide a service based on the text data to which the meaning of the word is given.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION

Figure 1:
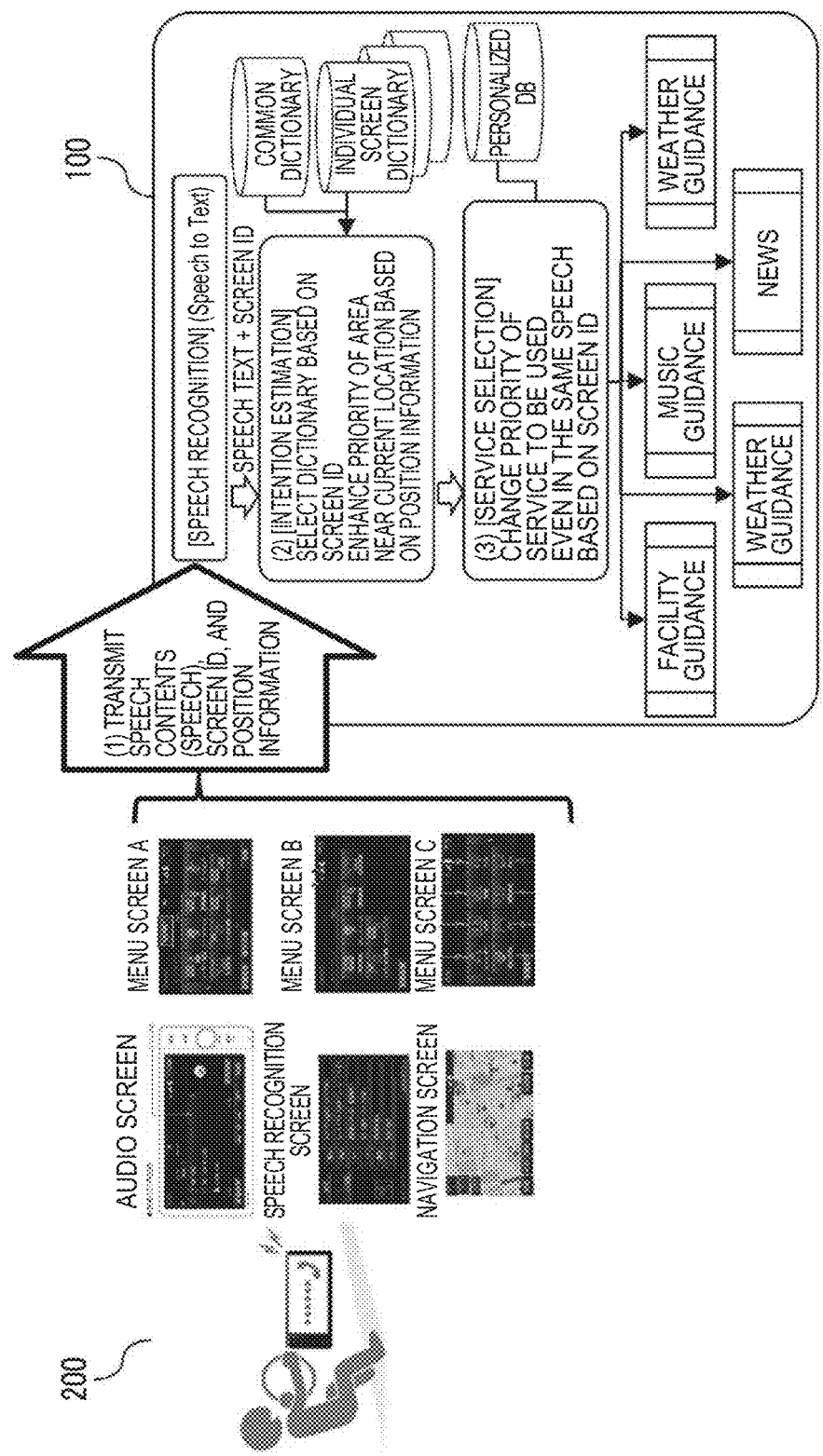
FIG. 1 is a diagram illustrating operations of an information processing device according to an embodiment.

Hereinafter, an embodiment of the present disclosure will be described with reference to the accompanying drawings. The embodiment described below is merely an example and it is not intended to exclude various modifications or technical applications which are not explicitly described below That is, the present disclosure can be modified in various forms without departing from the gist thereof. In the description below with reference to the drawings, the same or similar elements will be referred to by the same or similar reference signs. The drawings are schematic and dimensions, ratios, or the like therein do not necessarily coincide with actual dimensions, ratios, or the like. Elements having different dimensional relationships or ratios may be illustrated in the drawings.

[1. Entire Configuration]

Hereinafter, processes of an information processing system 1 according to this embodiment will be described with reference to FIG. 1. The information processing system 1 according to this embodiment includes an information processing device 100 which is embodied by an electronic control unit such as a server or a computer and a vehicle 200 in which an onboard unit capable of communicating with the information processing device 100 is mounted.

The onboard unit which is mounted in the vehicle 200 has various functions such as an audio function of allowing a user to listen to music, a navigation function of providing a route guidance service for a destination (hereinafter, the navigation function may be referred to as "navigation"), a weather information providing function of providing weather information, and a news information providing function of providing news.

At this time, the onboard unit includes a display device that displays a screen corresponding to a function which is provided to a user, a microphone that receives a speech input from the user, and a speaker that provides information to the user using sound.

Speech input to the microphone of the onboard unit from a user is transmitted as speech data from the vehicle 200 to the information processing device 100 which is embodied by an electronic control unit such as a server or a computer, and the information processing device 100 acquires the speech data. At this time, the onboard unit transmits a screen identifier (hereinafter also referred to as a "screen ID") for identifying a screen which is displayed on a display screen and position information of the vehicle 200 which is acquired from a GPS or the like to the information processing device 100 along with the speech data, and the information processing device 100 acquires context information associated with the user's situation such as the screen identifier or the position information.

The information processing device 100 converts the received speech data into text data and performs an intention estimating process for analyzing in what meaning the text data is used. Details thereof will be described below.

The same text or word may be used for different reasons (applications). For example, by text, "sakura," a user may intend a piece of music titled "sakura" or may intend a place famous for sakura. By text, "miyoshi," a user may intend Miyoshi, Aichi or may intend Miyoshi, Tokushima. Accordingly, the information processing device 100 analyzes the meaning of a word included in the text data, that is, the user's intention, using information based on the situation of the user such as the screen ID or the current position of the vehicle 200, that is, context information, in the intention estimating process. In the above-mentioned example, when the screen ID corresponding to a screen of the onboard unit indicates a screen associated with an audio function, the information processing device 100 can ascertain that the text, "sakura," means a title of a piece of music by selecting and referring to a music-relevant dictionary which is provided for a music screen. Similarly, when the screen ID received from the onboard unit indicates a navigation screen, the information processing device 100 can ascertain that the text, "sakura," means a feature of a Place such as a place famous for sakura by selecting and referring to a facility dictionary which is provided for the navigation, screen.

Similarly, when two results including Miyoshi, Aichi and Miyoshi, Tokushima are acquired by selecting and referring to the facility dictionary using the text, "miyoshi," the priority of the results can be changed depending on the position information received from the onboard unit of the vehicle 200. For example, the priority of Miyoshi, Aichi can be increased when the received position information of the vehicle 200 indicates Aichi, and the priority of Miyoshi, Tokushima can be increased when the position information indicates Tokushima.

After the intention of the text data has been analyzed, the information processing device 100 performs a process of selecting a service from various available services such as a facility guidance/destination setting service, music guidance (an audio operation service), and weather guidance using the text data of which the intention has been analyzed. At this time, even if details of speech data indicate the same text data or the same meaning (used for the same application), the priority of the service selected based on the screen ID can be changed. Information such as a frequency of use for each service may be stored in a personalized database (DB) and the priority for selection of a service may be changed based on the information.

Figure 2:
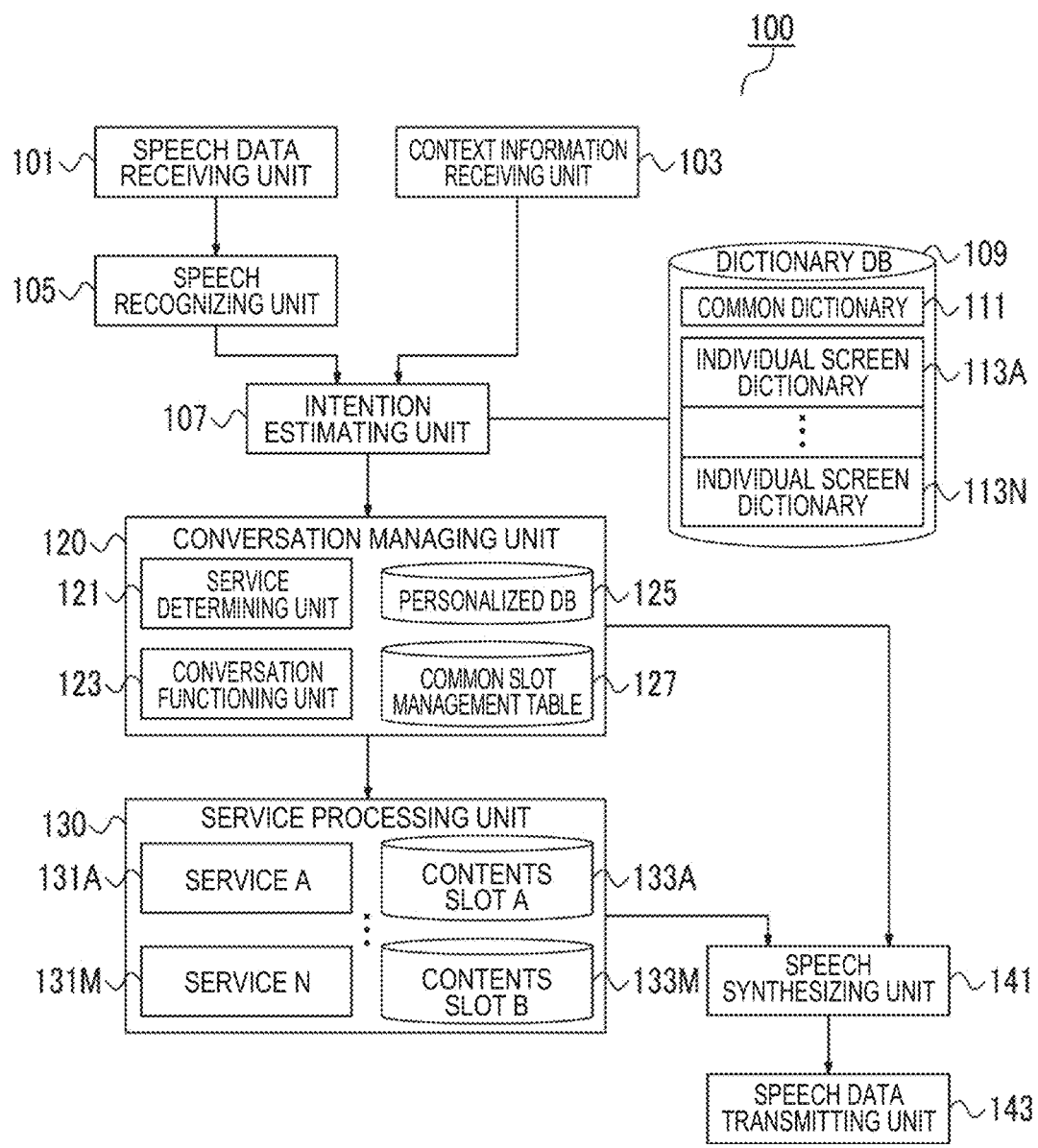
FIG. 2 is a diagram illustrating a functional configuration of the information processing device according to the embodiment.

The functional configuration of the information processing device 100 according to this embodiment will be described below with reference to FIG. 2. The information processing device 100 includes a speech data receiving unit 101, a context information receiving unit 103, a speech recognizing unit 105, an intention estimating unit 107, a dictionary DB 109, a conversation managing unit 120, a service processing unit 130, a speech synthesizing unit 141, and a speech data transmitting unit 143.

The speech data receiving unit 101 receives speech data uttered by a user, for example, from the onboard unit mounted in the vehicle 200. The speech recognizing unit 105 converts the speech data received by the speech data receiving unit 101 into text data.

The context information receiving unit 103 receives context information indicating in which situation the user has uttered the speech data received by the speech data receiving unit 101. The context information may include, for example, a screen ID which is allocated to a screen displayed by the onboard unit and position information indicating the current position of the vehicle 200. In the following description, it is assumed that the context information receiving unit 103 receives a screen ID and position information as the context information.

The intention estimating unit 107 divides text data (kana indicating the pronunciation of kanji) into which the user's speech data is converted into words (morphemes) by morphological analysis or the like and then performs an intention estimating process using the screen ID and the position information received by the context information receiving is 103. At this time, the intention estimating unit 107 selects and refers to a common dictionary 111 and screen-individual dictionaries 113A to 113N (hereinafter collectively referred to as a screen-individual dictionary 113) which are managed, by the dictionary DB 109.

The common dictionary 111 is a dictionary which can be used for any text data regardless of the screen ID or the position information. In the common dictionary 111, text (kana indicating the pronunciation of kanji) of a word (a morpheme) is correlated with the meaning thereof (for example, including information indicating in which context the text is used or part-of-speech information such as a facility name/a place name/a piece of music/weather).

The screen-individual dictionaries 113 are dictionaries correlated with, individual screen IDs and are selected and referred to for only text data on a specific screen ID. Examples of the screen-individual dictionaries 113 include a dictionary of titles of pieces of music which is prepared for a screen associated with an audio function and a dictionary of place names or facility names which is prepared for a destination setting screen in a navigation function. In details of the screen-individual dictionaries 113, similarly to the common dictionary 111, text (kana indicating the pronunciation of kanji) of a word (a morpheme) is correlated with the meaning thereof (for example, including information indicating in which context the text is used or part-of-speech information such as a facility name/a place name/a piece of music/weather).

The conversation managing unit 120 manages conversation with the user using text data to which the meaning is given by the intention estimating unit 107. The conversation managing unit 120 includes a service determining unit 121, a conversation functioning unit 123, a personalized DB 125, and a common slot management table 127.

The service determining unit 121 determines for which service the user utters speech. At this time, the screen ID, information on a service use history for each display screen of the user which is managed in the personalized DB 125, and the like are referred to. Particularly, regarding the screen ID, for example, when the screen ID is a screen ID associated with an audio function, the service determining unit 121 can preferentially select an audio operation service. When there is a plurality of service candidates, the service determining unit 121 can preferentially select a service Which has a high use frequency for the screen ID by checking the service use history for each past display screen in the personalized DB 125.

The conversation functioning unit 123 makes conversation with the user based on the service selected by the service determining unit 121. Specifically, words based on the text data uttered by the user are applied to items of slots which are managed by the common slot management table 127, and a speech uttering process for requesting the user for missing items is performed. For example, when items such as a destination, a departure place, and whether to use a toll road are required for using a destination setting service in the navigation function and a value associated with a destination (for example, "Miyoshi, Aichi" which is estimated by the intention estimating unit 107 in association with "Miyoshi" uttered by the user) is input from the user, the conversation functioning unit 123 substitutes the value of "Miyoshi, Aichi" for the item of "destination" in the common slots. When the item of whether to use a toll road is blank, the conversation functioning unit 123 instructs the speech synthesizing unit 141 to synthesize speech such as "Will you use a toll road?" When all the items of the slots for using the service selected by the service determining unit 121 are filled by conversation, the conversation managing unit 120 outputs information of the slots to the service processing unit 130.

The service processing unit 130 executes the selected service 131 from services 131A to 131M (hereinafter collectively referred to as "services 131") which can be provided by the information processing device 100. At this time, information which is sequentially necessary can be acquired by filling the contents slot 133 corresponding to the service 131 through conversation with the user.

The speech synthesizing unit 141 generates speech data into which speech such as "What a destination is?" and "It is fine tomorrow" is encoded under the control of the conversation managing unit 120 and the service processing unit 130. The generated speech data is transmitted from the speech data transmitting unit 143 to the vehicle 200.

Figure 3:
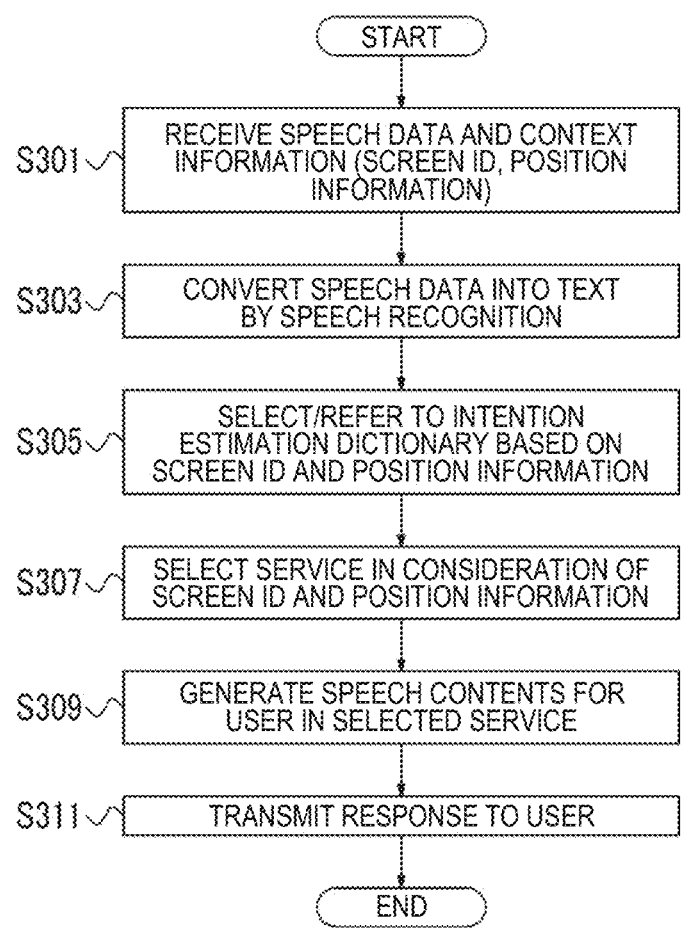
FIG. 3 is a flowchart illustrating a flow of processes which are performed by the information processing device illustrated in FIG. 2.

A process flow which is performed by the information processing device 100 will be described below with reference to FIG. 3. FIG. 3 is a flowchart illustrating a process flow which is performed by the information processing device 100.

Process steps which will be described below can be arbitrarily changed in the order or can be performed in parallel without causing inconsistency in process details, and another step may be added to each process step. A step which is conveniently described as one step may be performed in a plurality of steps, or steps which are conveniently described as a plurality of steps may be performed in one step.

First, the information processing device 100 receives speech data and context information (a screen ID and position information) using the speech data receiving unit 101 and the context information receiving unit 103 (S301). The speech recognizing unit 105 converts the received speech data into text data (S303). The intention estimating unit 107 performs morphological analysis or the like, on the converted text data and then refers to an intention estimation dictionary which is registered in the dictionary DB 109 using the acquired words. At this time, the intention estimating unit 107 selects a dictionary to be referred to (S305). More specifically, the intention estimating unit 107 can select and refer to the common dictionary 111 which is used in common and the screen-individual dictionaries 113 correlated with screen IDs. When there is a plurality of meanings, the meaning can be determined by changing the priorities of the meanings using the context information such as the screen ID or the position information.

The service determining unit 121 of the conversation managing unit 120 selects a service in consideration of conversation details, a screen ID, position information, and a service use history managed by the personalized DB (S307). The conversation functioning unit 123 generates speech contents to be delivered to the user based on the service selected by the service determining unit 121 (S309). Speech data based on the generated speech contents is generated by the speech synthesizing unit 141 and is transmitted from the speech data transmitting unit 143 to the onboard unit of the vehicle 200 (S311).

Figure 4:
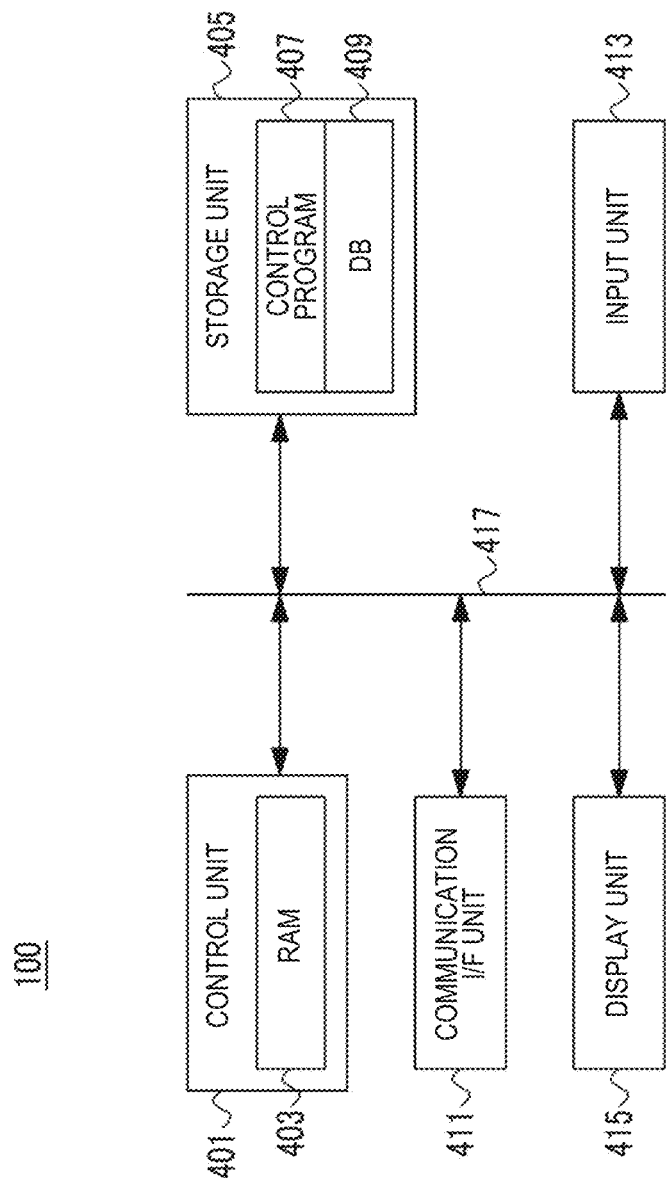
FIG. 4 is a diagram illustrating an example of a hardware configuration of the information processing device illustrated in FIG. 2.

A hardware configuration of the information processing device 100 which is embodied by an electronic control unit such as a computer will be described below with reference to FIG. 4. The information processing device 100 includes a control unit 401, a storage unit 405, a communication interface (I/F) unit 411, an input unit 413, and a display unit 415, and these elements are connected to each other via a bus line 417.

The control unit 401 includes a central processing unit (CPU) (not illustrated), a read only memory (ROM) (not illustrated), and a random access memory (RAM) 403. The control unit 401 is configured to perform processes corresponding to the elements illustrated in FIG. 2 in addition to the function as a general computer by executing a control program 407 stored in the storage unit 405. More specifically the speech data receiving unit 101, the context information receiving unit 103, the speech recognizing unit 105, the intention estimating unit 107, the conversation managing unit 120, the service processing unit 130, the speech synthesizing unit 141, and the speech data transmitting unit 143 illustrated in FIG. 2 can be embodied by the control program 407, which is temporarily stored in the RAM 4031 and then is executed by the CPU.

The RAM 403 temporarily stores codes included in the control program 407 or a part or all of information included in the DB 409. The RAM 403 is also used as a work area when the CPU performs various processes.

The storage unit 405 is a nonvolatile storage medium such as a hard disk drive (HDD) or a flash memory. The storage unit 405 stores an operating system (OS) for realizing a function as a general computer and a control program 407 which is an application program. The storage unit 405 stores a DB 409 including the dictionary DB 109 and the personalized DB.

The communication I/F unit 411 is a device that is used to transmit and receive speech data or the like to and from the vehicle 200 if necessary. The communication system which is used for communication between the information processing device 100 and the vehicle 200 is arbitrary, and examples thereof include a public telephone network, the Internet, or a combination thereof.

The input unit 413 is a device that receives an input operation from a user. Examples of the input unit 413 include various buttons, a touch panel, and a microphone.

The display unit 415 is a display device that presents a variety of information to a user who operates the information processing device 100. Examples of the display unit 415 include a liquid crystal display (LCD) and an organic electroluminescence (EL) display.

As described above, in the information processing system 1 according to this embodiment, a screen (such as a navigation screen, a destination setting, screen, a menu screen, or an audio screen) ID of the onboard unit is transmitted to the information processing device 100 along with speech contents (speech data or speech text) when an intention is estimated at the time of speech recognition. Accordingly, the information processing device 100 can use a dictionary based on a display screen or a prediction method for intention estimation by predicting speech contents from the user for each display screen or analyzing a trend of speech contents for each display screen. As a result, the information processing device 100 can improve accuracy of intention estimation for each user.

The above-mentioned embodiments are for facilitating understanding of a gist of the present disclosure, but are not for restrictively construing the gist of the present disclosure. Elements in the embodiments and arrangements, materials, conditions, shapes, sizes, and the like thereof are not limited to the exemplified ones and can be appropriately modified. Elements described in different embodiments may be partially interchanged or combined.

In the above-mentioned embodiments, "~unit," "~means," "~device," or "~system" does not merely refer to physical means, and the functions of "~units," "~means," "~devices" or "~systems" may be realized, in software. The function of one "~unit," "~means," "~device," or "~system" may be realized by two or more physical means at devices, and the functions of two or more "~units," "~means," "~devices," or "~systems" may be realized by one physical means or device.

What is claimed is:

1. An information processing device comprising an electronic control unit configured:
    to acquire speech data which is uttered by a user;
    to acquire context information associated with a situation of the user, the context information including a screen identifier displayed on a display screen;
    to convert the speech data into text data;
    to select a dictionary which is referred to for determining a meaning of a word included in the text data based on the screen identifier when the speech data has been acquired;
    to give the meaning of the word determined with reference to the selected dictionary to the text data; and
    to provide a service based on the text data to which the meaning of the word is given.

2. The information processing device according to claim 1, wherein the electronic control unit is configured to determine the meaning of the word based on the context information when the word is considered to have a plurality of meanings.

3. The information processing device according to claim 1, wherein the context information includes position information indicating a position of the user.

4. The information processing device according to claim 1, wherein the electronic control unit is configured to select the service which is to be provided based on the context information.

5. The information processing device according to claim 1, wherein the screen identifier is one of an audio screen, a navigation screen, a weather screen, or a news screen on the display screen.

6. The information processing device according to claim 5, wherein the dictionary is correlated with the screen identifier.

7. The information processing device according to claim 1, wherein the screen identifier does not require user input.

8. An information processing method of processing speech data which is uttered by a user using an electronic control unit, the information processing method comprising:
    causing the electronic control unit to acquire speech data uttered by the user;
    causing the electronic control unit to acquire context information associated with a situation of the user, the context information including a screen identifier displayed on a display screen;
    causing the electronic control unit to convert the speech data into text data;
    causing the electronic control unit to select a dictionary which is referred to for determining a meaning of a word included in the text data based on the screen identifier when the speech data has been acquired;
    causing the electronic control unit to give the meaning of the word determined with reference to the selected dictionary to the text data; and
    causing the electronic control unit to provide a service based on the text data to which the meaning of the word is given.

9. The information processing method according to claim 8, wherein the screen identifier is one of an audio screen, a navigation screen, a weather screen, or a news screen on the display screen.

10. The information processing method according to claim 9, further comprising correlating the dictionary with the screen identifier.

11. The information processing device according to claim 8, wherein the screen identifier does not require user input.

* * * * *

UNITED STATES PATENT AND TRADEMARK OFFICE
CERTIFICATE OF CORRECTION

PATENT NO. : 10,943,587 B2
APPLICATION NO. : 16/234858
DATED : March 9, 2021
INVENTOR(S) : Koichi Suzuki It is certified that error appears in the above-identified patent and that said Letters Patent is hereby corrected as shown below:

On the Title Page

Item [57], Line 4, delete "in" and insert --information--, therefor.

In the Specification

Column 1, Line 38, delete "JP 20074286136 A" and insert --JP 2007-286136 A--, therefor.

Column 2, Line 49, after "below", insert --.--.

Column 3, Line 53, after "navigation", delete ",".

Column 4, Line 39, after "receiving", delete "is" and insert --unit--, therefor.

Column 4, Line 43, after "managed", delete ",".

Column 4, Line 54, after "correlated with", delete ",".

Column 5, Line 16, after "service", delete "Which" and insert --which--, therefor.

Column 6, Line 10, after "like", delete ",".

Column 6, Line 48 & 49, after "specifically", insert --,--.

Column 6, Line 55, delete "RAM 4031" and insert --RAM 403--, therefor.

Column 7, Line 18, after "setting", delete ",".

Column 7, Line 41, delete ""~devices"" and insert --"~ devices,"--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*

Column 7, Line 41, after "realized", delete ",".

Column 7, Line 43, after "means", delete "at" and insert --or--, therefor.